US011168888B2

(12) United States Patent
Boyce et al.

(10) Patent No.: US 11,168,888 B2
(45) Date of Patent: Nov. 9, 2021

(54) GAS TURBINE ENGINE HEATERS (71) Applicant: HOTSTART, Inc., Spokane, WA (US)

(72) Inventors: Benjamin J. Boyce, Spokane, WA (US); Michael T. Abbott, Spokane Valley, WA (US)

(73) Assignee: HotStart, Inc., Spokane, WA (US)

( * ) Notice: Subject to any disclaimer, the term of this patent is extended or adjusted under 35 U.S.C. 154(b) by 162 days.

(21) Appl. No.: 16/527,681

(22) Filed: Jul. 31, 2019

(65) Prior Publication Data

US 2020/0040762 A1 Feb. 6, 2020

Related U.S. Application Data

(60) Provisional application No. 62/712,716, filed on Jul. 31, 2018.

(51) Int. Cl.
| | |
|---|---|
| *F23R 3/38* | (2006.01) |
| *B61C 5/00* | (2006.01) |
| *F02C 3/14* | (2006.01) |
| *F23R 3/52* | (2006.01) |
| *F23R 3/14* | (2006.01) |

(Continued)

(52) U.S. Cl.
CPC ............... *F23R 3/38* (2013.01); *B61C 5/00* (2013.01); *F01D 19/02* (2013.01); *F02B 39/10* (2013.01); *F02C 3/14* (2013.01); *F02C 3/34* (2013.01); *F23R 3/14* (2013.01); *F23R 3/52* (2013.01);
(Continued)

(58) Field of Classification Search
CPC ... B61C 5/00; B61C 5/04; F01D 13/00; F01D 13/003; F01D 15/10; F01D 19/02; F02B 39/10; F02C 3/14; F02C 3/16; F02C 3/34; F02C 6/18; F02C 7/22; F05D 2220/40; F05D 2220/50; F05D 2220/64; F05D 2220/76; F05D 2240/36; F05D 2250/184; F05D 2260/20; F05D 2260/213; F05D 2270/303; F23C 2900/03002; F23R 3/14;
(Continued)

(56) References Cited

U.S. PATENT DOCUMENTS

| | | | |
|---|---|---|---|
| 1,327,256 | A | 1/1920 | Scheminger, Jr. |
| 2,595,505 | A | 5/1952 | Bachle |

(Continued)

FOREIGN PATENT DOCUMENTS

| | | |
|---|---|---|
| GB | 2026904 A | 2/1980 |
| JP | 58148309 A | 1/1983 |

OTHER PUBLICATIONS

Non Final Office Action dated May 12, 2020 for U.S. Appl. No. 16/051,168 "Combustor Systems" Boyce, 17 pages.
(Continued)

*Primary Examiner* — Jesse S Bogue
(74) *Attorney, Agent, or Firm* — Lee & Hayes, P.C.

(57) ABSTRACT

An engine heater system for heating a diesel engine of a vehicle. The engine heater system including a gas turbine. A heat exchanger communicatively coupled to an exhaust of the gas turbine. An electric generator including connection members to couple to a battery of the vehicle, and a shaft rotatably attached between the gas turbine and the electric generator. The heat exchanger utilizes the exhaust of the gas turbine to keep the diesel engine of the vehicle within a desired temperature range, and the electric generator charges the battery when the gas turbine rotates the shaft.

12 Claims, 4 Drawing Sheets

(51) Int. Cl.
  *F01D 19/02* (2006.01)
  *F02B 39/10* (2006.01)
  *F02C 3/34* (2006.01)
  *F01D 13/00* (2006.01)

(52) U.S. Cl.
  CPC ........ *F01D 13/003* (2013.01); *F05D 2220/40* (2013.01); *F23C 2900/03002* (2013.01)

(58) Field of Classification Search
  CPC ... F23R 3/38; F23R 3/52; Y02T 30/00; Y02T 50/60; Y02T 10/144; B60Y 2400/435
  See application file for complete search history.

(56) References Cited

U.S. PATENT DOCUMENTS

| | | |
|---|---|---|
| 2,720,750 A | 10/1955 | Schelp |
| 2,856,755 A | 10/1958 | Szydiowski |
| 3,204,408 A | 9/1965 | Vincent |
| 3,381,669 A | 5/1968 | Tschudi |
| 3,535,875 A | 10/1970 | Sneeden |
| 3,983,694 A | 10/1976 | Bracken, Jr. |
| 4,040,251 A | 8/1977 | Heitmann et al. |
| 4,148,185 A * | 4/1979 | Somers ................ F01K 25/005 60/39.17 |
| 4,314,443 A | 2/1982 | Barbeau |
| 4,414,918 A | 11/1983 | Holland et al. |
| 4,425,892 A | 1/1984 | Firey |
| 4,458,844 A | 7/1984 | Mitsui |
| 4,519,549 A | 5/1985 | Yokoe et al. |
| 4,706,452 A | 11/1987 | Lavoie |
| 4,918,925 A | 4/1990 | Tingle |
| 4,919,333 A | 4/1990 | Weinstein |
| 5,009,206 A | 4/1991 | Yi |
| 5,029,442 A * | 7/1991 | Nishiyama ................ F01N 5/02 60/606 |
| 5,042,256 A | 8/1991 | Smith |
| 5,224,339 A | 7/1993 | Hayes |
| 5,555,788 A | 9/1996 | Gakhar et al. |
| 6,102,687 A | 8/2000 | Butcher et al. |
| D441,423 S | 5/2001 | Goknur et al. |
| 6,347,754 B1 | 2/2002 | Prus |
| D493,683 S | 8/2004 | Hortenbury et al. |
| 7,086,854 B2 | 8/2006 | Rakhmailov et al. |
| 7,401,578 B2 * | 7/2008 | Otterstrom ................ F02G 5/04 123/3 |
| D582,004 S | 12/2008 | Eshet et al. |
| 7,896,620 B1 | 3/2011 | Ewing, Jr. |
| 7,992,514 B1 | 8/2011 | Weisenberg et al. |
| 8,096,264 B2 | 1/2012 | Seitz |
| D653,523 S | 2/2012 | Wackwitz et al. |
| 8,141,360 B1 * | 3/2012 | Huber ................ F02D 29/06 60/606 |
| D726,367 S | 4/2015 | Dukat |
| 9,149,865 B2 | 10/2015 | Smeets et al. |
| D744,066 S | 11/2015 | Peterson et al. |
| 9,222,491 B2 * | 12/2015 | Buzzard ................ F15B 20/00 |
| D753,201 S | 4/2016 | Kim |
| D786,936 S | 5/2017 | Manning et al. |
| D817,736 S | 5/2018 | Kao |
| 10,119,460 B2 * | 11/2018 | Primus ................ F02C 6/20 |
| D837,830 S | 1/2019 | Romani et al. |
| D847,228 S | 4/2019 | Wang |
| D847,884 S | 5/2019 | Hayakawa et al. |
| D871,877 S | 1/2020 | Terris et al. |
| D881,767 S | 4/2020 | Yoder et al. |
| D897,032 S | 9/2020 | Rix et al. |
| 2004/0020206 A1 * | 2/2004 | Sullivan ................ F01K 23/101 60/670 |
| 2004/0045302 A1 | 3/2004 | Brown |
| 2005/0039463 A1 | 2/2005 | Condevaux et al. |
| 2005/0097889 A1 | 5/2005 | Pilatis et al. |
| 2007/0144500 A1 * | 6/2007 | Dupree ................ F01N 5/02 123/568.12 |
| 2007/0186556 A1 | 8/2007 | Rasheed et al. |
| 2007/0234721 A1 * | 10/2007 | Vuk ................ F01N 5/04 60/608 |
| 2007/0234725 A1 | 10/2007 | Critchley et al. |
| 2008/0171294 A1 | 7/2008 | Critchley et al. |
| 2010/0155504 A1 | 6/2010 | Yamasaki et al. |
| 2010/0181138 A1 * | 7/2010 | Khadiya ................ F01N 3/023 180/301 |
| 2010/0193602 A1 | 8/2010 | Ballu et al. |
| 2011/0094483 A1 * | 4/2011 | Suh ................ F02M 26/32 123/568.12 |
| 2012/0131923 A1 | 5/2012 | Elkady et al. |
| 2012/0240588 A1 | 9/2012 | Patel et al. |
| 2013/0213050 A1 | 8/2013 | Shakariyants |
| 2014/0373533 A1 * | 12/2014 | Jensen ................ F01K 23/065 60/612 |
| 2015/0125264 A1 * | 5/2015 | Lighty ................ F16N 7/385 415/111 |
| 2015/0224521 A1 | 8/2015 | Peterson et al. |
| 2015/0251198 A1 | 9/2015 | Bak et al. |
| 2015/0367862 A1 | 12/2015 | Ledbetter et al. |
| 2018/0156118 A1 * | 6/2018 | Lighty ................ F01D 25/18 |
| 2018/0185859 A1 | 7/2018 | Kishimoto et al. |
| 2020/0041130 A1 | 2/2020 | Boyce et al. |
| 2020/0041131 A1 | 2/2020 | Boyce et al. |

OTHER PUBLICATIONS

Non Final Office Action dated Dec. 15, 2020 for U.S. Appl. No. 16/527,822, "Rotary Atomizer", Boyce, 22 pages.

* cited by examiner

GAS TURBINE ENGINE HEATERS

RELATED APPLICATIONS

This application claims priority to U.S. Provisional Patent Application No. 62/712,716, filed on Jul. 31, 2018, of which is incorporated herein by reference.

BACKGROUND

Engine heaters maintain a temperature of an internal combustion engine. For example, fuel fired heaters exist which are used onboard vehicles, such as locomotives, trucks, automobiles, ships, etc. in order to maintain the combustion engines within a desired temperature range.

In some onboard applications, fuel fired heaters may employ a fan and a combustor in order to maintain the combustion engines within a desired temperature range. The fan may be employed by the fuel fired heaters to provide air to the combustor. However, the fan may be a parasitic load on a battery of the vehicle. For example, the fan of the fuel fired heater may be powered by the battery of the vehicle, reducing a charge of the battery of the vehicle.

Moreover, the fuel fired heaters may employ a pump in order to maintain the combustion engines within a desired temperature range. The pump may be employed by the fuel fired heaters to provide for pumping an engine oil or an engine coolant. However, the pump may also be a parasitic load on the battery of the vehicle. For example, the pump of the fuel fired heater may be powered by the battery of the vehicle, again reducing a charge of the battery of the vehicle.

Thus, there remains a need to develop new fuel fired heaters that are more efficient and not a parasitic load on the vehicle the fuel fired heaters are maintaining within a desired temperature range.

SUMMARY

This summary is provided to introduce simplified concepts for systems, devices, and components of the disclosure which are further described below in the Detailed Description. This summary is not intended to identify essential features of the claimed subject matter, nor is it intended for use in determining the scope of the claimed subject matter.

In an embodiment, an engine heater system may provide for heating a diesel engine of a vehicle (e.g., a locomotive, a ship, or a truck, etc.). The engine heater system may be located onboard of the vehicle and may include a heat exchanger communicatively coupled to an exhaust of a gas turbine. The heat exchanger may utilize the exhaust of the gas turbine to keep the diesel engine of the vehicle within a desired temperature range. A shaft may be rotatably attached between the gas turbine and an electric generator, and the generator may charge the battery when the gas turbine rotates the shaft.

In an embodiment, an engine heater system may include a heat exchanger communicatively coupled to an exhaust of a gas turbine. The heat exchanger may utilize the exhaust of the gas turbine to keep the diesel engine of the vehicle within a desired temperature range.

In an embodiment, a shaft may be rotatably attached between a gas turbine and an electric generator. When the gas turbine rotates the shaft, the generator charges a battery of the vehicle.

In an embodiment, a combustor system may include a toroidal-shaped combustion zone having an outside perimeter opposite a central hole. An airflow channel may interface with the outside perimeter of the toroidal-shaped combustion zone. The airflow channel may provide for delivering air to the toroidal-shaped combustion zone. An atomizer component may be fixed to a portion of a shaft extending into the central hole of the toroidal-shaped combustion zone. The atomizer component may provide for atomizing a liquid fuel into the toroidal-shaped combustion zone when the shaft is rotated.

In an embodiment, a combustor system may include a toroidal-shaped combustion zone having an outside perimeter opposite a central hole. An atomizer component may be fixed to a portion of a shaft extending into the central hole of the toroidal-shaped combustion zone. The atomizer component may provide for atomizing a liquid fuel into the toroidal-shaped combustion zone when the shaft is rotated.

In an embodiment, a combustor system may include a toroidal-shaped combustion zone having an outside perimeter opposite a central hole. An airflow channel may interface with the outside perimeter of the toroidal-shaped combustion zone. The airflow channel may provide for delivering air to the toroidal-shaped combustion zone.

In an embodiment, a rotary atomizer may include an atomizer component fixable to a shaft having a longitudinal axis. The atomizer component may include a plate and a wall extending from a perimeter of the plate. The wall may have a height varying curvilinearly along the perimeter of the plate. The plate may extend transversely to the longitudinal axis of the shaft, and the wall may extend from the plate in a direction of extension of the longitudinal axis of the shaft. When the shaft is rotated and a liquid is introduced to the plate of the atomizer component, the varying height of the wall causes the liquid to atomize away from the atomizer component.

In an embodiment, an atomizer component may include a plate and a wall extending from a perimeter of the plate. The wall may have a height varying curvilinearly along the perimeter of the plate. When the atomizer component is rotated and a liquid is introduced to the plate of the atomizer component, the height of the wall varying curvilinearly along the perimeter of the plate atomizes the liquid away from the atomizer component.

In an embodiment, an atomizer component may include a plate and a wall extending from a perimeter of the plate. The wall may have a plurality of peaks interspersed by a plurality of troughs along the perimeter of the plate. When the atomizer component is rotated, the plurality of peaks interspersed by the plurality of troughs along the perimeter of the plate atomizes a liquid away from the atomizer component.

BRIEF DESCRIPTION OF THE DRAWINGS

The detailed description is described with reference to the accompanying figures. The use of the same reference numbers in different figures indicates similar or identical items.

DETAILED DESCRIPTION

Overview

As noted above, engine heaters may employ fans and/or pumps that are parasitic loads on batteries of the vehicles the engine heaters are maintaining within a desired temperature range. This disclosure is directed to engine heater systems, for heating a diesel engine of a vehicle for example, that are not a parasitic load on the vehicles, and therefore are more efficient. In an embodiment of the instant application, the engine heater systems include a heat exchanger communicatively coupled to an exhaust of a gas turbine and a shaft rotatably attached between the gas turbine and an electric generator. The heat exchanger utilizing the exhaust of the gas turbine to keep the diesel engine of the vehicle within a desired temperature range, and the generator charging the battery of the vehicle when the gas turbine rotates the shaft.

Traditional engine heaters have been installed onboard of vehicles and arranged to keep the diesel engine within a desired temperature range via a fan receiving electric power from the battery of the vehicle. For example, an electric fan powered by a battery of the vehicle may be employed with a combustor in order to maintain the diesel engine within a desired temperature range. Moreover, traditional engine heaters may be configured to use an electric pump also powered by a battery of the vehicle to maintain the diesel engine within a desired temperature range. Because traditional engine heaters utilize a battery of the vehicle to power fans and/or pumps, they are parasitic to the vehicle and inefficient at maintaining the diesel engine of the vehicle with a desired temperature range. Having fans and/or pumps that are not powered by a battery of the vehicle to keep an engine with in a desired temperature range, may allow for optimizing a vehicle's operation and reduce power consumption costs.

Accordingly, this disclosure describes engine heater systems that may result in a more efficient operation of the vehicle. In an embodiment, a heat exchanger may be communicatively coupled to an exhaust of a gas turbine, the heat exchanger utilizing the exhaust of the gas turbine to keep the engine of the vehicle within a desired temperature. Further, an electric generator charges a battery of the vehicle when the gas turbine rotates a shaft rotatably attached between the gas turbine and the electric generator.

While this application describes implementations that are described in the context of an onboard engine heater system for maintaining a diesel engine of a vehicle within a desired temperature, the implementations described herein may be used in other environments and are applicable to other contexts. For example, the engine heater systems may be located at any desired location, including with a generator (e.g., backup generator) located at a server farm, a hospital, a high-rise building, remote cell tower site, an urban cell tower site, an oil site, a gas site, etc.

In an embodiment, the engine heater systems may include a trapped vortex combustor. For example, a gas turbine of the engine heater system may be communicatively coupled to a trapped vortex combustor. The trapped vortex combustor may include a toroidal-shaped combustion zone having an outside perimeter opposite a central hole. An airflow channel may interface with the outside perimeter of the toroidal-shaped combustion zone for delivering air to the toroidal-shaped combustion zone. An atomizer component may be fixed to a portion of a shaft of the engine heater system. The atomizer component may provide for atomizing a liquid fuel into the toroidal-shaped combustion zone when the gas turbine rotates the shaft.

In an embodiment, a trapped vortex combustor may include an atomizer component including a plate and a wall extending from a perimeter of the plate. The wall may have a height varying curvilinearly along the perimeter of the plate. When the shaft is rotated and a liquid is introduced to the plate of the atomizer component, the varying height of the wall causes the liquid to atomize away from the atomizer component.

Example Engine Heaters

Figure 1:
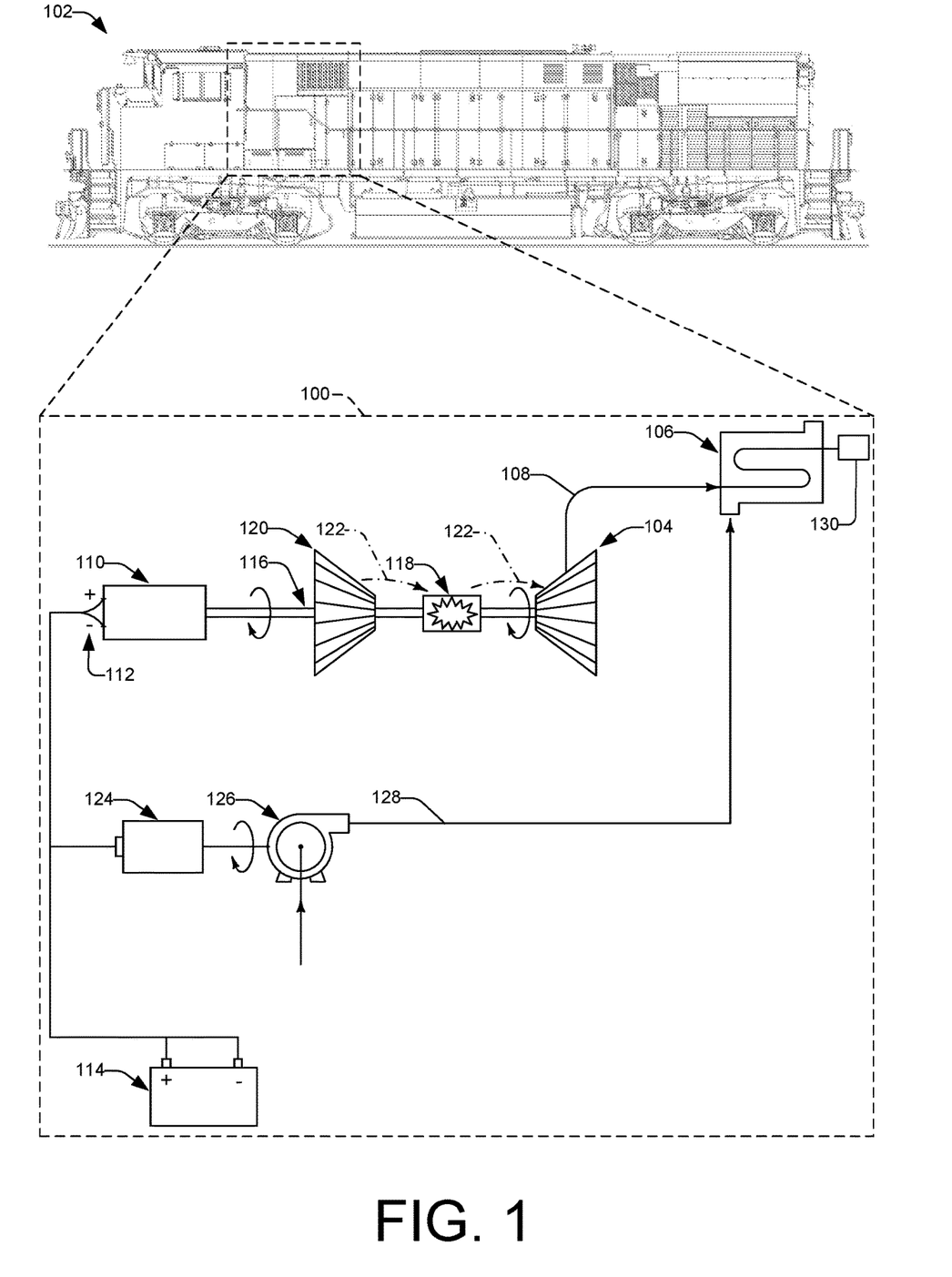
FIG. 1 illustrates an example engine heater system for heating a diesel engine of a vehicle according to an embodiment of the instant disclosure.

FIG. 1 illustrates an example engine heater system 100 for heating a diesel engine of a vehicle 102. While FIG. 1 illustrates the vehicle 102 is a locomotive (e.g., a diesel electric locomotive), the vehicle 102 may be a ship, a truck, a car, etc. The engine heater system 100 may be onboard of the vehicle 102. For example, the engine heater system 100 may be arranged on the vehicle 102 for heating the diesel engine of the vehicle 102.

The engine heater system 100 may include a gas turbine 104. A heat exchanger 106 may be communicatively coupled to an exhaust 108 of the gas turbine 104. An electric generator 110 including connection members 112 may be coupled to a battery 114 of the vehicle 102. The battery 114 may be a battery bank of a diesel electric locomotive. A shaft 116 may be rotatably attached between the gas turbine 104 and the electric generator 110. A combustor system 118 may be communicatively coupled to the gas turbine 104. The combustor system 118 may be a trapped vortex combustor (discussed in more detail below with regard to FIG. 2). The combustor system 118 may provide for heating air. The heated air then acts on the blades of the gas turbine 104 to rotate the gas turbine 104. The rotating gas turbine 104 rotates the shaft 116. When the gas turbine 104 rotates the shaft 116, the electric generator 110 charges the battery 114. Moreover, the heat exchanger 106 utilizes the exhaust 108 of the gas turbine 104 to keep the diesel engine of the vehicle 102 within a desired temperature range.

In one example, the heat exchanger 106 may utilize the exhaust 108 of the gas turbine 104 to heat an engine coolant of the diesel engine of the vehicle 102 to keep the diesel engine within the desired temperature range. In another example, the heat exchanger 106 may utilize the exhaust 108 of the gas turbine 104 to heat an engine oil of the diesel engine of the vehicle 102 to keep the diesel engine within the desired temperature range. In another example, the heat exchanger 106 may utilize the exhaust 108 of the gas turbine 104 to heat an engine coolant of the diesel engine of the vehicle 102 to keep a cab of the vehicle 102 at a desired temperature.

FIG. 1 illustrates the engine heater system 100 may include a compressor 120. The compressor 120 may be attached to the shaft 116. The compressor 120 may force air 122 to the combustor system 118. When the gas turbine 104 rotates the shaft 116, the shaft 116 rotates the compressor 120 to force the air 122 to the combustor system 118.

The connection members 112 may further couple electric generator 110 to an electric motor 124 of a coolant pump 126. When the gas turbine 104 rotates the shaft 116, the electric generator 110 may power the electric motor 124 of the coolant pump 126. The coolant pump 126 may force engine coolant 128 through the heat exchanger 106. The exhaust 108 of the gas turbine 104 may then heat the engine coolant 128 forced through the heat exchanger 106 by the coolant pump 126. The heated engine coolant 128 may be used to keep the diesel engine within the desired temperature range. While FIG. 1 illustrates an coolant pump 126 for forcing engine coolant 128 through the heat exchanger 106, an oil pump (not shown) may be powered by the electric generator 110 to force engine oil through the heat exchanger 106. In such an embodiment, the exhaust 108 of the gas turbine 104 may heat the engine oil forced through the heat exchanger 106 by the oil pump. The heated engine oil may be used to keep the diesel engine within the desired temperature range. The heat exchanger 106 may be further communicatively coupled to an exhaust pipe 130 for venting the exhaust. While FIG. 1 illustrates the exhaust 108 of the gas turbine 104 heating an engine oil, the exhaust 108 of the gas turbine 104 may heat a hydraulic oil, a fuel (e.g., diesel fuel), etc.

Because the engine heater system 100 includes the gas turbine 104 that rotates the compressor 120, charges the battery 114, and powers the coolant pump 126, rather than drawing power from the battery 114, the engine heater system 100 is not a parasitic load on the battery 114 of the vehicle 102 and is more efficient. For example, because the gas turbine 104 rotates the compressor 120 and powers the coolant pump 126, the engine heater system 100 does not require power from the battery 114 to run the compressor 120 or the coolant pump 126, and instead charges the battery 114 making the engine heater system 100 more efficient.

Example Combustor Systems

Figure 2:
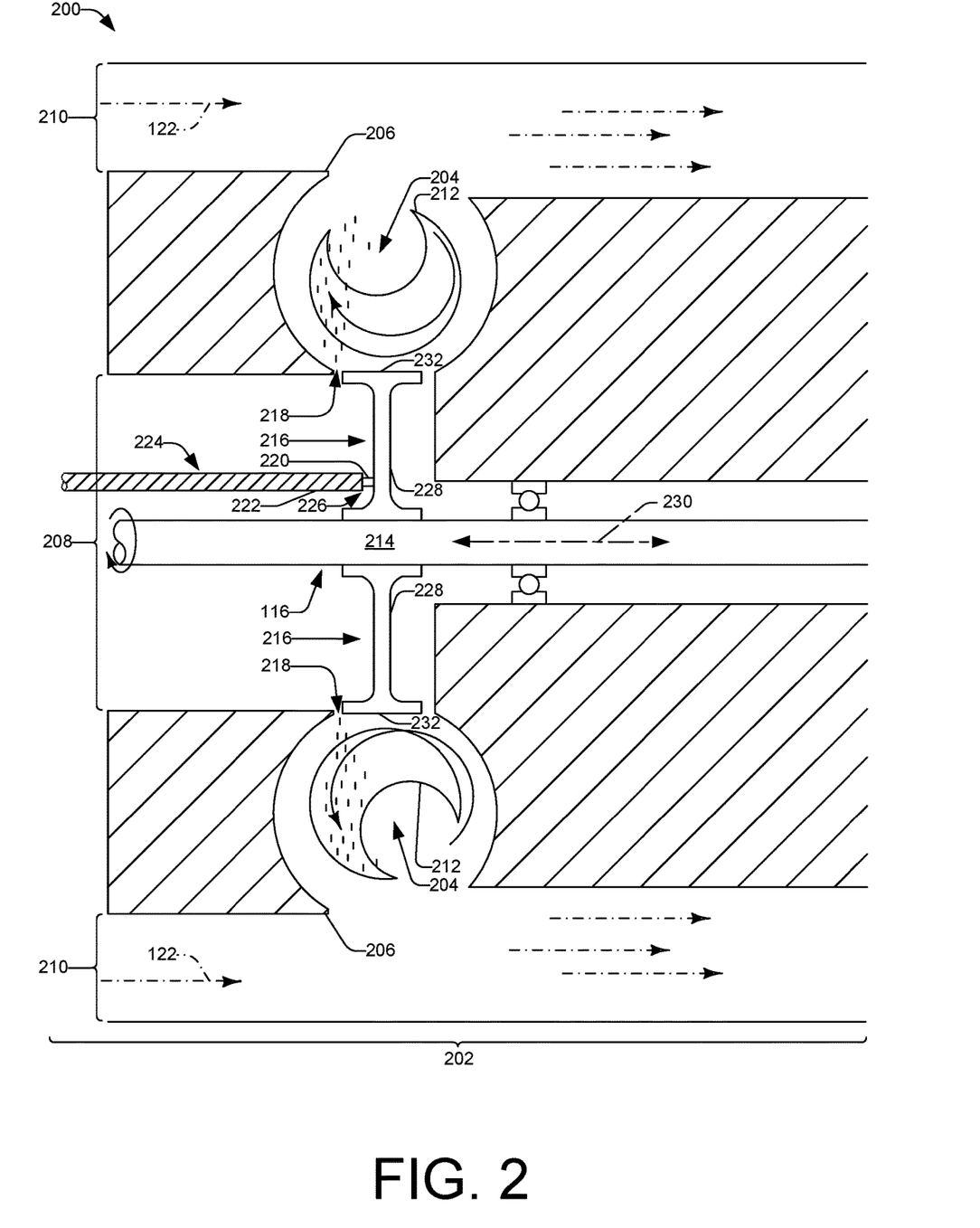
FIG. 2 illustrates a section view of an example combustor system according to an embodiment of the instant disclosure.

FIG. 2 illustrates a section view 200 of an example combustor system 202. The combustor system 202 may be implemented in the engine heater system 100 of FIG. 1. The combustor system 202 may be the same as the combustor system 118 discussed above.

FIG. 2 illustrates the combustor system 202 may include a toroidal-shaped combustion zone 204. The toroidal-shaped combustion zone 204 may have an outside perimeter 206 opposite a central hole 208. An airflow channel 210 may interface with the outside perimeter 206 of the toroidal-shaped combustion zone 204 for delivering the air 122 to the toroidal-shaped combustion zone 204. For example, the compressor 120 may force the air 122 through the airflow channel 210 for delivering the air 122 to the toroidal-shaped combustion zone 204. The compressor 120 may force an amount of air that is dependent on the engine heater system 100 output and fuel burned. In one example, the engine heater system 100 may be a 15 kW (kilowatt) heater and the compressor 120 may force about 14 cfm (cubic feet per minute) through the airflow channel 210. In another example, the engine heater system 100 may be a 30 kW heater and the compressor 120 may force about 28 cfm through the airflow channel 210. The toroidal-shaped combustion zone 204 may heat the air 122. For example, the toroidal-shaped combustion zone 204 may contain a flame vortex 212 that heats the air 122 delivered by the airflow channel 210. The airflow channel 210 may deliver the heated air 122 to the gas turbine 104.

At least a portion 214 of the shaft 116 may extend into the central hole 208 of the toroidal-shaped combustion zone 204. An atomizer component 216 may be fixed to the portion 214 of the shaft 116. The atomizer component 216 may provide for atomizing 218 a liquid fuel 220 into the toroidal-shaped combustion zone 204 when the shaft 116 is rotated. For example, when the shaft 116 is rotated by the gas turbine 104, the shaft 116 rotates the atomizer component 216 and the liquid fuel 220 that is introduced to the rotating atomizer component 216 is atomized 218 into the toroidal-shaped combustion zone 204. When the shaft 116 is rotated, the shaft 116 may rotate at about 6000 revolutions per minute (rpm).

The gas turbine 104 may be communicatively coupled to the toroidal-shaped combustion zone 204. As discussed above, the heat exchanger 106 may be communicatively coupled to an exhaust of the gas turbine 104. The portion 214 of the shaft 116 extending into the central hole 208 of the toroidal-shaped combustion zone 204 may be a first portion of the shaft 116, and a second portion of the shaft 116 may be attached to the gas turbine 104.

At least a portion 222 of a tube 224 may be arranged in the central hole 208 of the toroidal-shaped combustion zone 204. The tube 224 may provide for introducing the liquid fuel 220 to the atomizer component 216. For example, the tube 224 may have an end 226 arranged proximate to the atomizer component 216 for dispensing the liquid fuel 220 onto the atomizer component 216. The tube 224 may have an inside diameter of about 0.09 inch, and the liquid fuel 220 may be pressurized, inside of the tube 224, at about 30 pounds per square inch (psi) for introducing the liquid fuel 220 to the atomizer component 216.

In an embodiment, the atomizer component 216 may include a plate 228 fixed to the portion 214 of the shaft 116. The breadth of the plate 228 may extend in a direction transversely to a direction of extension of the longitudinal axis 230 of the shaft 116. A wall 232 may extend from an outer perimeter of the plate 228. The wall 232 may extend from the plate 228 in the direction of extension of the longitudinal axis 230 of the shaft 116. The wall 232 may have a varying height that causes the liquid fuel 220 to atomize 218 away from the atomizer component 216 when the rotateable shaft 116 is rotated (discussed in more detail below with regard to FIGS. 2 and 3).

Because the combustor system 202 includes the large tube 224 for dispensing the liquid fuel 220 to the atomizer component 216, the combustor system 202 is well-suited suited for use with dirty liquid fuel (e.g., liquid fuel having debris), less susceptible to the tube 224 becoming clogged, and incurs relatively less maintenance as compared to a plurality of smaller nozzles having smaller orifices that may atomize the liquid fuel 220 into the toroidal-shaped combustion zone 204. For at least these reasons, the combustor system 202 is more efficient than combustor systems employing a plurality of smaller nozzles to atomize the liquid fuel.

While this application describes the combustor system 202 being implemented in the engine heater system 100 of FIG. 1, the combustor system 202 described herein may be used in other environments and is applicable to other contexts. For example, the combustor system 202 may be implemented in a gas-powered generator, including with a gas-powered generator located on an airplane, on a ship, in a submarine, in a generator (e.g., backup generator) located at a server farm, a hospital, a high-rise building, remote cell tower site, an urban cell tower site, an oil site, a gas site, etc.

Example Atomizer Components

Figure 3:
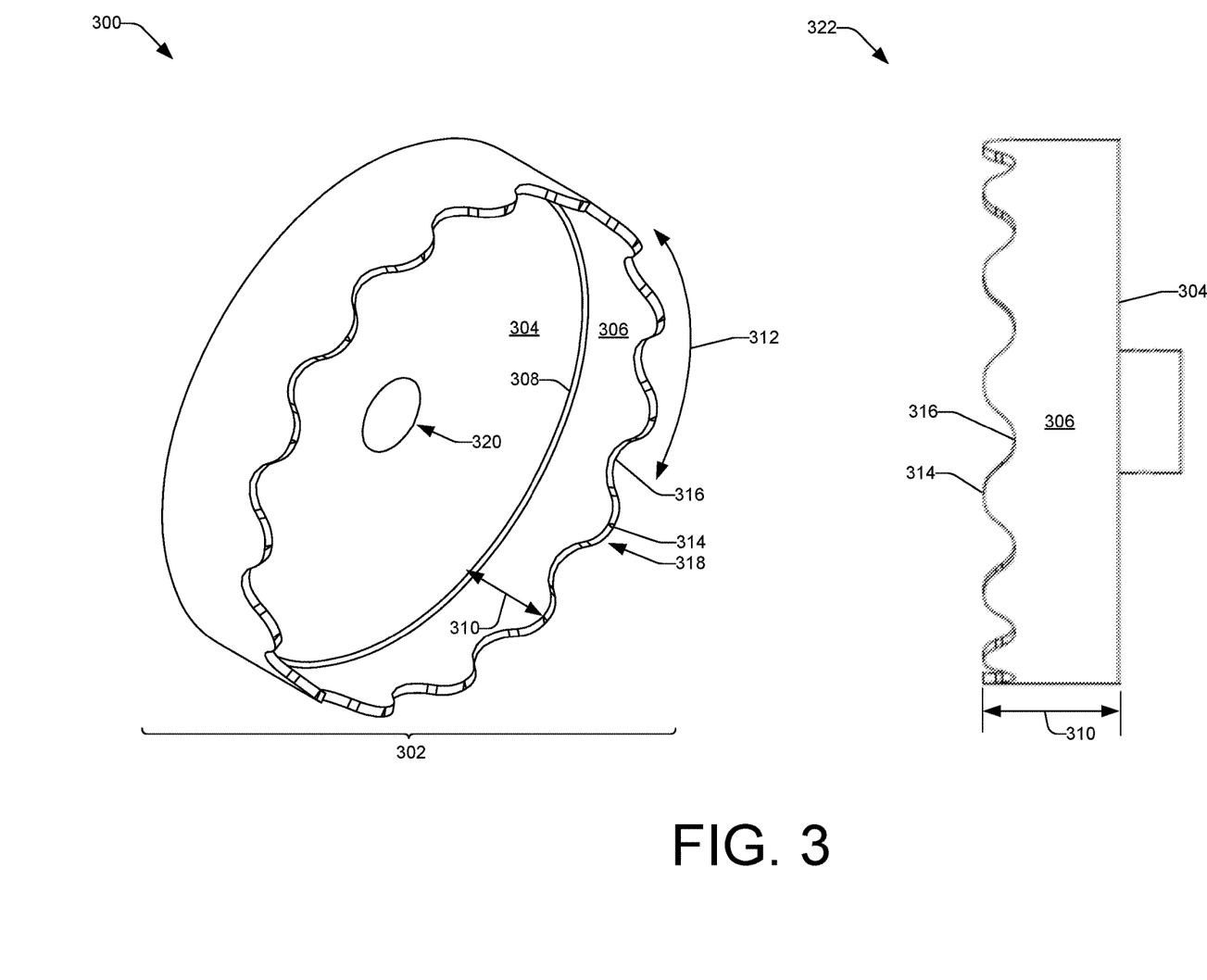
FIG. 3 illustrates a perspective view of an example atomizer component according to an embodiment of the instant disclosure.
Figure 4:
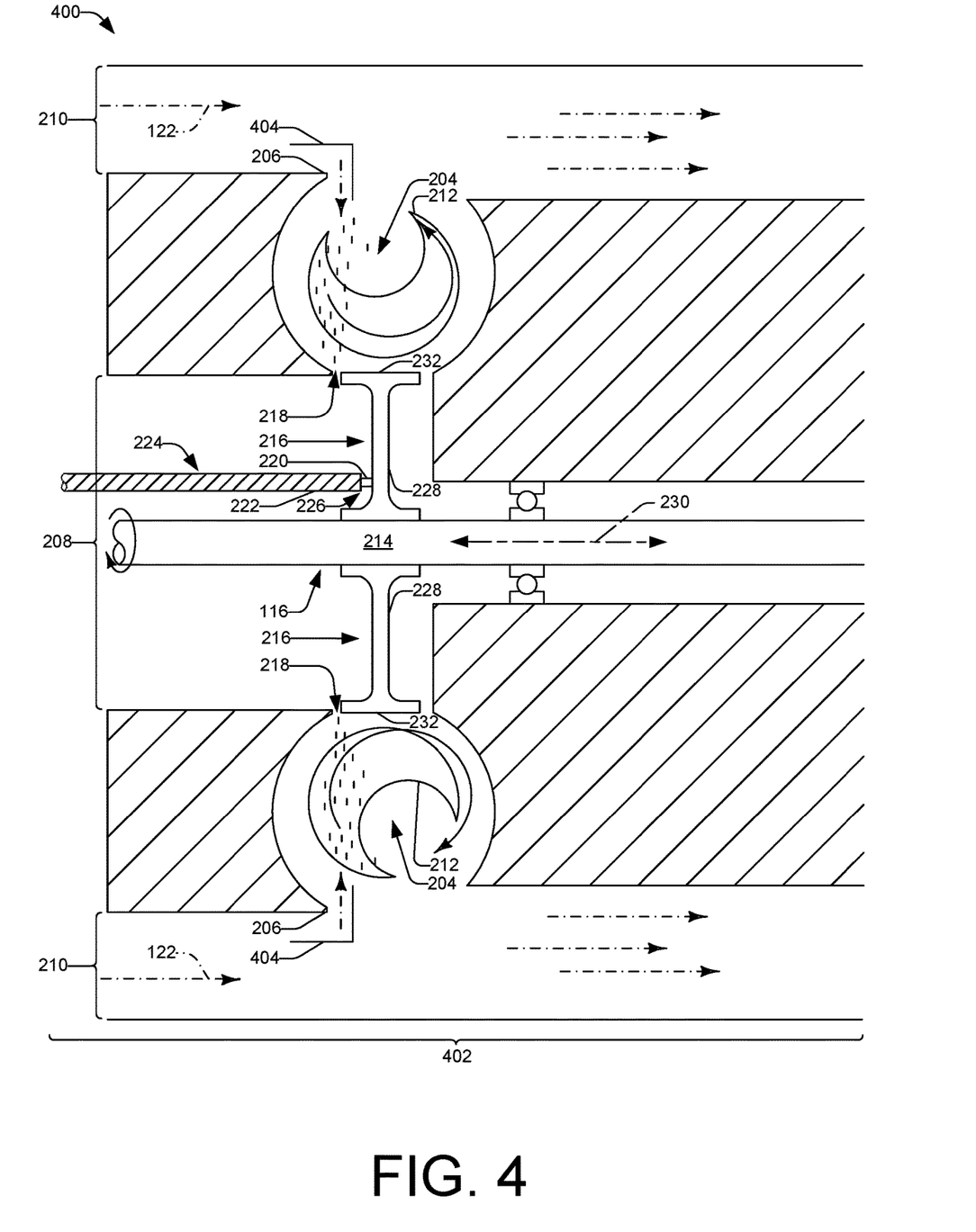
FIG. 4 illustrates a section view of another example combustor system according to an embodiment of the instant disclosure.

FIG. 3 illustrates a perspective view 300 of an example atomizer component 302. The atomizer component 302 may be implemented in the combustor system 202 of FIG. 2. The atomizer component 302 may be the same as the atomizer component 216 discussed above.

FIG. 3 illustrates the atomizer component 302 may include a plate 304. A wall 306 may extend from a perimeter 308 of the plate 304. The perimeter 308 of the plate 304 may have a curvilinear shape. In an example embodiment, an outside diameter of the plate 304 may be about 3 inches. However, the size of the diameter may vary according to the specific and varying needs of different implementations of the atomizer component 302. The wall 306 may have a height 310 varying curvilinearly 312 along the perimeter 308 of the plate 304. For example, the wall 306 may have a plurality of peaks 314 interspersed by a plurality of troughs 316 along the upper end (edge 318) of the wall 306 as it extends around the perimeter 308 of the plate 304. Stated otherwise, a profile of the wall 306 may have a plurality of teeth spaced consecutively along a length of the wall 306. The varying height 310 of the wall 306 may have a difference of about 0.2 inches between a first height of the varying height 310 of the wall 306 and a second height of the varying height 310 of the wall 306. For example, a peak of the plurality of peaks 314 and a trough of the plurality of troughs 316 may have a difference in height of about 0.2 inches. Adjacent peaks of the plurality of peaks 314 may be separated a distance of about 0.6 inches. Likewise, adjacent troughs of the plurality of troughs 316 may be separated a distance of about 0.6 inches. Accordingly, each peak of the plurality of peaks 314 may be separated by a distance of about 0.3 inches from an adjacent trough of the plurality of troughs 316. In an embodiment, each peak of the plurality of peaks 314 and each trough of the plurality of troughs 316 may have a radius of about 0.2 inches. In an alternative embodiment (not shown), the radius may vary from peak to peak, either uniformly or selectively. Side profile view 322 illustrates the profile of the wall 306 may have a plurality of teeth spaced consecutively along a length of the wall 306.

The varying height 310 of the wall 306 defines the edge 318 of the wall 306. For example, the plurality of peaks 314 interspersed by the plurality of troughs 316 along the perimeter 308 of the plate 304 may define the edge 318 of the wall 306. In an example embodiment, the edge 318 of the wall 306 may have a perimeter length of about 11 inches, a thickness of about 0.1 inch, and an overall height of about 0.5 inch. The edge 318 of the wall 306 may be a sharp edge to enhance the atomization of the fluid. However, the sizes of the perimeter, thickness, and overall height may vary according to the specific and varying needs of different implementations of the atomizer component 302.

While FIG. 3 illustrates the varying height 310 of the wall 306 having a smooth repetitive oscillational shape (e.g., sinusoidal shape), the varying height 310 of the wall 306 may have other shapes. For example, the varying height 310 of the wall 306 may have a sharp repetitive oscillational shape, a smooth irregular (e.g., non-repetitive) oscillational shape, a sharp irregular oscillational shape, etc. For the purposes of this disclosure, a "sharp" shape may refer to the change in direction of the wall height going into or out of a trough as being non-curvilinear or non-radial, and instead the change in direction is abruptly transverse.

The atomizer component 302 may be fixed to a shaft (e.g., shaft 116) via a mounting portion 320 arranged with the plate 304. In an example, the mounting member 320 may simply include an opening through the plate 304, where the opening is sized to receive at least a portion of the shaft. In another example, the mounting portion 320 may further include a coupler (not shown) to couple with a mating coupler attached to at least a portion of the shaft. In another example, the mounting member 320 may further include a collar (not shown) to receive at least a portion of the shaft. In another example, the mounting member 320 may further include a fastener (e.g., a threaded fastener, a snap-fit fastener, a press-fit fastener, a friction-fit fastener, etc.) (not shown) to fasten to a mating fastener attached to at least a portion of the shaft. In an example embodiment, the mounting member 320 may have an inside diameter of about 0.4 inch to receive at least a portion of the shaft. However, the size of the inside diameter may vary according to the specific and varying needs of different implementations of the atomizer component 302.

While FIG. 3 illustrates the atomizer component 302 may be fixed to a shaft via a mounting member 320, the atomizer component 302 may be fixed to a shaft via any other desired means. For example, the atomizer component 302 may be fixed to a shaft via welding. In another example, the atomizer component 302 and the shaft may be formed of a single piece (e.g., a single unit) of material (e.g., metal, plastic, composite, etc.).

Similar to the atomizer component 216 discussed above, when the atomizer component 302 is fixed to a shaft (e.g., shaft 116), the breadth of the plate 304 extends in a direction transversely to a direction of extension of a longitudinal axis of the shaft, and the wall 306 extends from the plate 304 in the direction of extension of the longitudinal axis of the shaft. When the shaft is rotated and a liquid is introduced to the plate 304 of the atomizer component 302, the varying height 310 of the wall 306 causes the liquid to atomize away from the atomizer component 302. For example, when the liquid is a liquid fuel (e.g., liquid fuel 220), and when the shaft is rotated and the liquid fuel is introduced to the plate 304 of the atomizer component 302, the varying height 310 of the wall 306 causes the liquid fuel to atomize (e.g., atomize 218) away from the atomizer component 302 and into a combustion zone (e.g., toroidal-shaped combustion zone 204). Similarly, when the liquid is a liquid fuel and when the shaft is rotated and the liquid fuel is introduced to the plate 304 of the atomizer component 302, the plurality of peaks 314 interspersed by the plurality of troughs 316 along the perimeter 308 of the plate 304 cause the liquid fuel to atomize away from the atomizer component 302 and into a combustion zone.

When compared to a conventional atomizer component, because the atomizer component 302 of the instant disclosure has a varying height 310, the atomizer component 302 has a perimeter length longer than a perimeter length of a conventional atomizer component that has a constant height along the perimeter thereof. For the purposes of the instant disclosure, "perimeter length" refers to the measurable length of the extension of the wall edge 318 beginning and ending at a reference point on the wall 306, from which the length is measured along the edge 318 as it varies up and down in height. For example, the atomizer component 302 having the varying height 310 may have a perimeter length of about 11 inches, while a conventional atomizer component having a constant wall height and a plate with the same diameter as the atomizer component 302, may have a perimeter length of about 9 inches. Because the atomizer component 302 has a longer perimeter length than a perimeter length of a conventional atomizer component having a constant height along a perimeter of the atomizer component, the linear speed of the atomizer component 302 is greater than the linear speed of the conventional atomizer component. For example, the atomizer component 302 may have a linear speed of about 1060 inches per second, while the conventional atomizer component having the same diameter as the atomizer component 302 and having a constant height, may have linear speed of about 900 inches per second when rotated at the same speed of about 6,000 revolutions per minute.

Further, when compared to a conventional atomizer component, because the atomizer component 302 of the instant disclosure has a varying height 310, the atomizer component 302 distributes droplets of the atomized liquid fuel over a wider area. The wider area permits more air to be interspersed between the droplets, which accelerates evaporation. The accelerated evaporation then results in a higher efficiency of combustion than the conventional atomizer component. The droplet area may be a result of a depth of the varying height 310. For example, the droplet area may be a result of a distance from peak to trough of the varying height 310. Because the atomizer component has the varying height 310, the varying height 310 produces a wider droplet area (e.g., particle distribution) than atomizer components not having a varying height, but rather have holes or knife edges. For example, because the atomizer component has the varying height 310, the varying height 310 produces a wide droplet area of about 0.15 inches as compared to a thin band droplet area of about 0.01 inches produced by the atomizer components having holes or knife edges.

While this application describes the atomizer component 302 being implemented in the combustor system 202 of FIG. 2, the atomizer component 302 described herein may be used in other environments and is applicable to other contexts. For example, the atomizer component 302 may be implemented in a turbine engine, including with a turbine engine located on an airplane, a helicopter, a boat, a submarine, etc. Further, the atomizer component 302 may be implemented in a sprayer, including with a paint sprayer, a snow cannon (e.g., snow gun), an airbrush, an insecticide sprayer, a pressure washer, etc.

Another Example Combustor Systems

FIG. 4 illustrates a section view 400 of another example combustor system 402 that may be implemented in the engine heater system 100 of FIG. 1. The combustor system 402 may be the same as the combustor system 118 discussed above. Inasmuch as FIG. 4 depicts the combustor system 402 implementable in the engine heater system 100 of FIG. 1, while referring to the same elements and features of the combustor system 402, the following discussion of specific features may refer interchangeably to any of FIG. 1, 2, or 3 except where explicitly indicated. In particular, FIG. 4 illustrates an embodiment of the combustor system 402, including the toroidal-shaped combustion zone 204, the airflow channel 210, the atomizer component 216, and the tube 224.

FIG. 4 illustrates the combustor system 402 may include a guide vane 404. The guide vane 404 may be disposed adjacent a leading side of the toroidal-shaped combustion zone 204 in a direction of air flow through the airflow channel 210 so that the airflow channel 210 guides a portion of the air 122 from the airflow channel 210 directly into the toroidal-shaped combustion zone 204. The portion of the air 122 guided by the guide vane 404 into the toroidal-shaped combustion zone 204 may provide for a reversed flame vortex 406. For example, the guide vane 404 may cause reversal of the direction of the flame vortex 212 illustrated in FIG. 2. A reversed flame vortex 406 may have a higher efficiency of combustion than the flame vortex 212 illustrated in FIG. 2.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An engine heater system for heating a diesel engine of a vehicle, the engine heater system comprising:
- a gas turbine;
- a heat exchanger communicatively coupled to an exhaust of the gas turbine;
- an electric generator including connection members coupled directly to a battery of the vehicle and connection members coupled directly to an electric motor of a coolant pump, the coolant pump communicatively coupled to the heat exchanger; and
- a shaft rotatably attached between the gas turbine and the electric generator;
- wherein the coolant pump forces an engine coolant through the heat exchanger and the heat exchanger utilizes the exhaust of the gas turbine to heat the engine coolant forced through the heat exchanger, and
- wherein the heated engine coolant keeps the diesel engine of the vehicle within a desired temperature range, and the electric generator charges the battery when the gas turbine rotates the shaft.

2. The engine heater system of claim 1, wherein the engine heater system is onboard of the vehicle.

3. The engine heater system of claim 1, wherein the vehicle comprises a locomotive, a ship, or a truck.

4. The engine heater system of claim 1, wherein the heat exchanger utilizes the exhaust of the gas turbine to heat the engine coolant of the diesel engine of the vehicle to further keep a cab of the vehicle at a desired temperature.

5. An engine heater system for heating a diesel engine of a vehicle, the engine heater system comprising:
- a gas turbine; and
- a heat exchanger communicatively coupled to an exhaust of the gas turbine;
- an electric generator including connection members coupled directly to an electric motor of a coolant pump and directly coupled to a battery of the vehicle, the coolant pump communicatively coupled to the heat exchanger wherein the coolant pump forces an engine coolant through the heat exchanger and the heat exchanger utilizes the exhaust of the gas turbine to heat the engine coolant forced through the heat exchanger, and
- wherein the heated engine coolant keeps the diesel engine of the vehicle within a desired temperature range.

6. The engine heater system of claim 5, wherein the engine heater system is onboard of the vehicle.

7. The engine heater system of claim 5, wherein the vehicle comprises a locomotive, a ship, or a truck.

8. The engine heater system of claim 5, wherein the heat exchanger utilizes the exhaust of the gas turbine to heat the engine coolant of the diesel engine of the vehicle to further keep a cab of the vehicle at a desired temperature.

9. An engine heater system for heating a diesel engine of a vehicle, the engine heater system comprising:
- a gas turbine and a compressor;
- an electric generator, the electric generator including connection members to couple directly to a battery of the vehicle and connection members to couple directly to an electric motor of a coolant pump, the coolant pump communicatively coupled to a heat exchanger;
- a shaft rotatably attached between the gas turbine and the electric generator; and
- a combustor disposed between the gas turbine and the compressor and communicatively coupled to the gas turbine, at least a portion of the shaft extends into the combustor such that when the gas turbine rotates the shaft, the rotation of the shaft atomizing a liquid fuel in the combustor; and wherein when the gas turbine rotates the shaft, the electric generator charges the battery and heated engine coolant keeps the diesel engine of the vehicle within a desired temperature range.

10. The engine heater system of claim 9, wherein the engine heater system is onboard of the vehicle.

11. The engine heater system of claim 9, wherein the vehicle comprises a locomotive, a ship, or a truck.

12. The engine heater system of claim 9, wherein the electric generator further includes connection members to couple to an electric motor of an oil pump.

* * * * *